Jan. 15, 1957 A. D. GLOVER 2,777,486
ROTATABLE TOOL HOLDER FOR LATHE-TYPE ROTARY CUTTING TOOLS
Filed March 25, 1954 2 Sheets-Sheet 1

INVENTOR.
ARMAND D. GLOVER
BY R. E. Meech
ATTORNEY

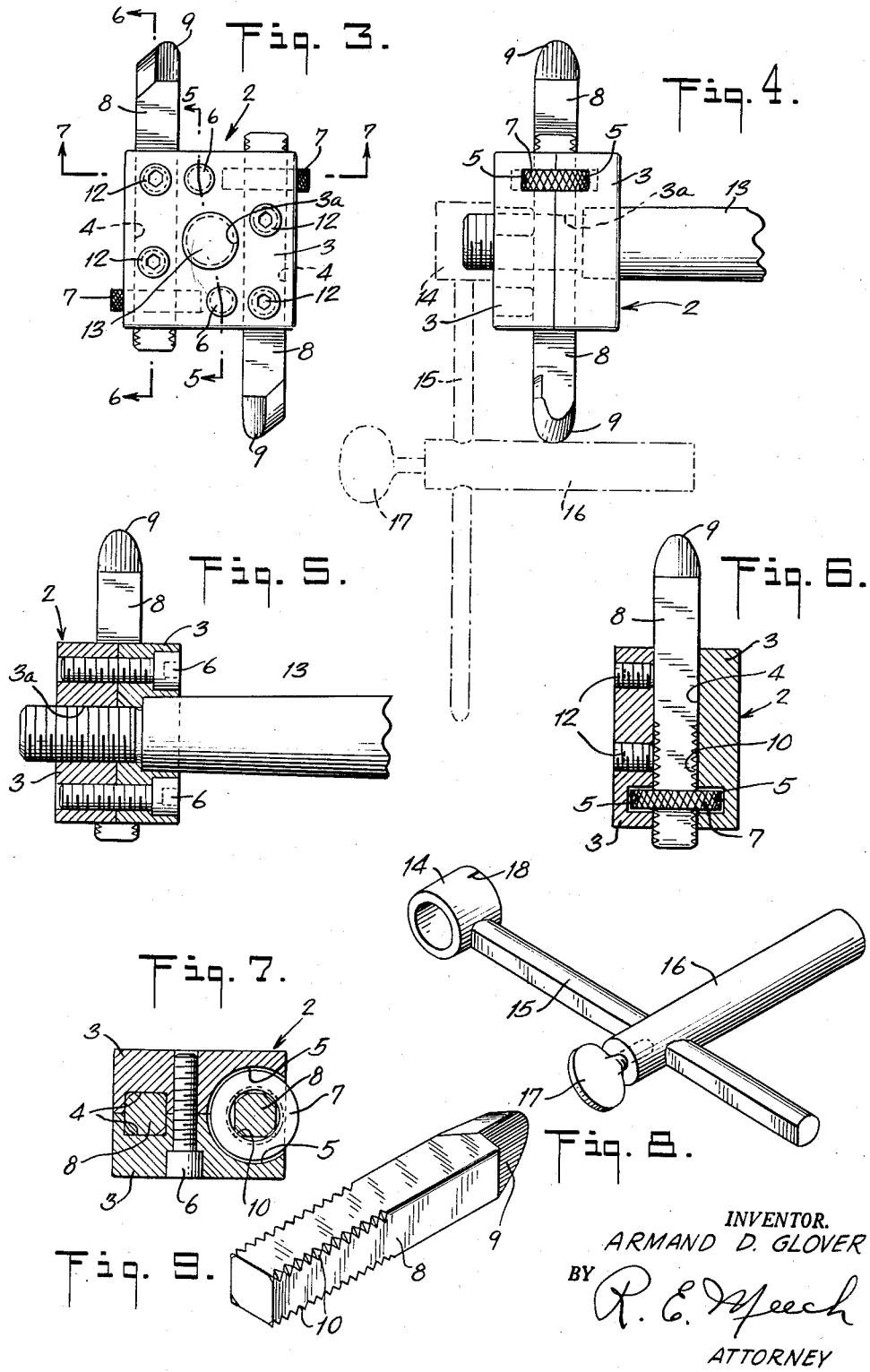

United States Patent Office 2,777,486
Patented Jan. 15, 1957

2,777,486

ROTATABLE TOOL HOLDER FOR LATHE-TYPE ROTARY CUTTING TOOLS

Armond D. Glover, Meadville, Pa.

Application March 25, 1954, Serial No. 418,602

6 Claims. (Cl. 144—231)

This invention relates to wood cutting tools, and particularly to an improved rotatable tool holder or adapter for adjustably securing the cutting tools therein.

It is the general object of the present invention to provide an improved tool holder, generally used with machines of the type for making core boxes and the like, having improved means for adjusting accurately the cutting tools in position and for securing the same in their adjusted position.

It is another object of the invention to provide an improved rotatable tool holder or adapter having means for adjusting and securing the cutting tools in position therein so as to prevent displacement thereof during the use of the tool holder.

It is a further object of this invention to provide an improved tool holder or adapter which is simple and inexpensive in its construction, and at the same time efficient and effective in its use.

Various other objects and advantages of this invention will be more apparent in the course of the following specification, and will be particularly pointed out in the appended claims.

In the accompanying drawings, there is shown for the purpose of illustration, an embodiment which my invention may assume in practice.

Figure 1:
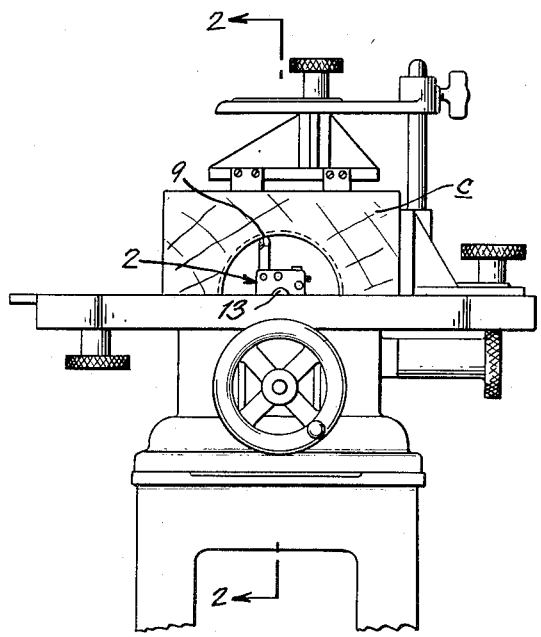
Figure 2:
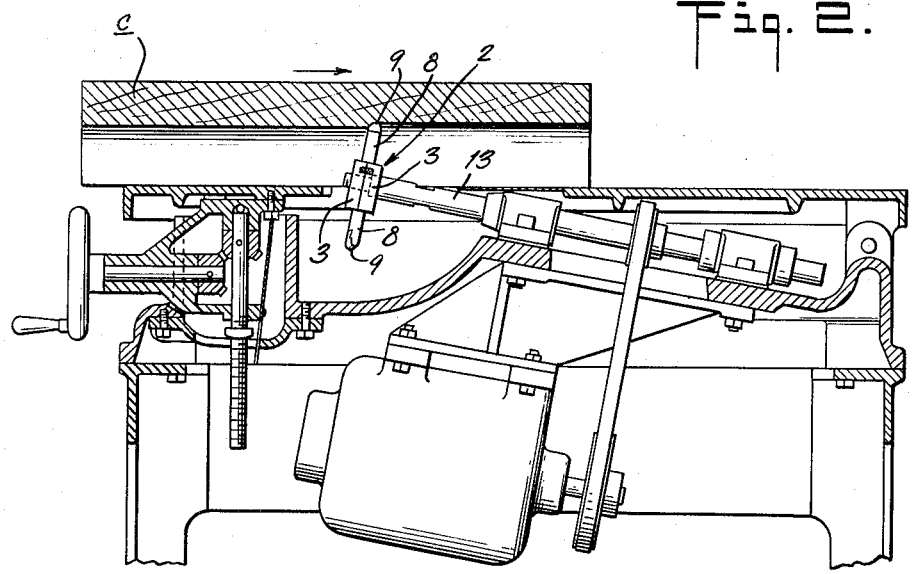

In these drawings:

Fig. 1 is a front view of a machine with which the improved tool holder of the present invention is shown incorporated, Fig. 2 is a sectional view taken on line 2—2 of Fig. 1, Fig. 3 is a plan view of the improved tool holder of my invention, Fig. 4 is a side view thereof, as shown in Fig. 3, showing how this tool holder is used, Fig. 5 is a sectional view taken on line 5—5 of Fig. 3, Fig. 6 is a sectional view taken on line 6—6 of Fig. 3, Fig. 7 is a sectional view taken on line 7—7 of Fig. 3, Fig. 8 is a perspective view of a device for setting and adjusting cutting tools in the tool holder, and Fig. 9 is a perspective view of one of the tools used in connection with my tool holder.

Referring more particularly to the drawings, the machine shown in Figures 1 and 2 is the same as that shown in the patent to De Loss No. 2,568,187 issued September 11, 1951, and since the present invention is concerned only with an improved tool holder for use with a machine of this type, the machine will not be described in detail and for a full disclosure of this machine reference may be had to the aforesaid patent.

According to the present invention, as more clearly shown in Figures 3 through 8 of the drawing, my improved tool holder or adapter comprises a body member 2 preferably consisting of a pair of similar rectangular-shaped parts or halves 3 having aligned threaded holes arranged therein, as at 3a. There is arranged on the inner side of each of the parts 3, a pair of spaced-apart elongated cutting tool receiving channels 4 being substantially U-shaped in cross section with one arranged to either side of the hole 3a therein substantially parallel to one another.

On the inner side of each of these parts 3 there is arranged a chamber 5 adjacent the opposed ends of the channels 4 and which communicate with the respective channels. These chambers 5 also open outwardly into and through the respective outer side walls of the body member 2 as shown in Figures 3, 4, and 7, for a purpose presently to be described.

It will be seen that these two parts or halves 3 are positioned in superimposed relation with the U-shaped channels 4 and chambers 5 in the respective parts in opposed relation and the two parts held together by means of a pair of screws 6, so as to provide a unitary body member having a threaded hole in the center with a rectangular-shaped channel arranged to either side thereof in parallel relation, as more clearly shown in Figures 3 and 7 and a chamber arranged at right angles thereto at opposed ends of the channels and which communicate therewith. In each of these chambers, there is arranged an interiorly threaded annular nut-like member 7 which is preferably knurled around the outer periphery thereof. The axes of these annular members 7 are substantially in alignment with the axes of the respective channels with which they are associated.

There is slidably mounted in each of these channels 4 of the body member 2, a cutting tool 8 having a cutting edge 9 on the outer end thereof with the cutting edge of one tool extending outwardly from the side of the body member opposite that from the other. On the inner end of each of the cutting tools 8, there is arranged a threaded portion 10, which is disposed within the respective annular members 7 and which cooperates with the threads therein to effect movement of the cutting tools upon rotatable movement of the respective annular members. In one of the parts 3 of the body member, there is arranged in threaded holes communicating with the respective channels two pairs of set screws 12 with two disposed opposite each of the channels therein and which are adapted to extend into their respective channels into engagement with the respective tools therein for clamping securely the cutting tools 8 in their respective channels to prevent movement thereof relative to the body member during use of the tool.

The tool holder of my invention is used in the following manner. The body member 2 is preferably screwed directly on to the outer threaded end of a rotatable spindle or shaft 13 of the machine with which it is to be used, as shown in Figures 1, 2 and 5 of the drawings. Both of the cutting tools 8 are then adjusted for the desired depth of cut to be made in the work piece, for example, a core box C. This adjustment is preferably made with the aid of a measuring and setting device, as shown in Fig. 8 of the drawings. Such a device consists of an annular end portion 14 having an outwardly extending arm 15 secured to the periphery thereof. On this arm there is slidably mounted an outwardly extending member 16 having a set screw 17 arranged in the end thereof for securely locking and clamping it to the arm 15. On the inner side of the annular portion 14, there is arranged preferably a hair line 18 which is in line with the axis of this annular portion.

In using this device, the member 16 is moved and adjusted along the arm 15 for the depth of cut desired to be made by the cutting tools 8. That is, the depth of the cut will be the distance between the hair line 18 and the inner side of the member 16 and this is measured by means of a scale. The set screw 17 is then tightened so as to lock securely the member 16 in its adjusted position on the arm 15.

The annular end portion 14 is then arranged on the outer end of the shaft or spindle 13 so as to be positioned directly next to the tool holder of the present invention thereon, as shown in the broken lines of Fig. 4. It will be assumed that all of the set screws 12 have been previously loosened so as to permit both of the cutting tools 8 to move reciprocably in their respective channels. The measuring device is then rotated and held in position so that the member 16 thereof is positioned directly opposite the outer end of the cutting edge 9 of one of the tools 8. This cutting tool 8 is then moved longitudinally of its respective channel by rotating the respective annular member 7 until the outer cutting edge thereof contacts the inner side of the member 16 of the measuring device. The respective two set screws 12 are then tightened so as to securely lock and clamp this tool in its adjusted position.

The measuring device is then rotated and held in position so that the member 16 is positioned directly opposite the outer end of the cutting edge 9 of the other tool 8. This cutting tool is then adjusted in its respective channel as before relative to the member 16 by means of the respective annular member 7 and the respective set screws 12 are then tightened. This completes the adjustment of the cutting tools for the desired cut and the measuring device is removed from the end of the shaft or spindle 13 and laid aside for the next cutting tool adjustment. The tool holder together with the cutting tools carried thereby is now in readiness for the cutting operation.

As a result of my invention it will be seen that the cutting tools 8 can be accurately adjusted in their respective channels by means of the annular members 7 and securely held in their adjusted position by means of the set screws 12. It will also be seen that the annular members 7 also aid in holding the cutting tools in their adjusted position so as to prevent displacement thereof during use in case the set screws 12, for any reason, become loosened. By providing such a construction, it will be seen that both tools can be quickly and easily adjusted so that the same depth of cut is obtained by each tool in the work piece upon rotation of the tool holder.

While I have shown and described an embodiment which my invention may assume in practice, it will be understood that this embodiment is merely for the purpose of illustration and description, and that other forms may be devised within the scope of my invention as defined in the appended claims.

What I claim as my invention is:

1. A rotatable tool holder of the class described comprising a rectangular-shaped body member having a pair of spaced apart substantially rectangular-shaped elongated tool receiving channels therein, a pair of interiorly threaded annular members carried by said body member with one co-operating with and extending into each of said channels having their axes substantially in alignment with the axes of the respective channels and extending outwardly through an opening in the outer side of said body member, a cutting tool substantially rectangular-shaped in cross section slidably arranged in each of said channels having the cutting edges thereof extending outwardly from opposite sides of said body member, each of said cutting tools having an exteriorly threaded portion which cooperates with the interior threads of the respective annular members to effect movement of the cutting tools longitudinally of said channels upon rotatable movement of the respective annular members, whereby said cutting tools may be adjusted selectively in said body member, and means carried by said body member for securely clamping both of said tools in their adjusted positions in said channels.

2. A rotatable tool holder of the classs described comprising a substantially rectangular-shaped body member having a pair of spaced apart substantially parallel rectangular-shaped cutting tool receiving channels extending therethrough and a chamber arranged at right angles to each of said channels intermediate the length thereof with one communicating with each of said channels, each of said chambers opening into the outer side of said body member on opposite sides thereof, an interiorly threaded annular member arranged in each of said chambers having their axes substantially in alignment with the axes of the respective channels and extending outwardly through the respective openings in the outer sides of said body member, a cutting tool slidably mounted in each of said channels having the cutting edges thereof extending outwardly from opposite sides of said body member, each of said cutting tools having an exteriorly threaded portion which cooperates with the interior threads of the respective annular members to effect movement of said cutting tools longitudinally of said channels upon rotatable movement of the respective annular members, whereby said cutting tools may be adjusted selectively in said body member, and means carried by said body member for securely clamping both of said tools in their adjusted positions in said channels.

3. A rotatable tool holder of the class described comprising a rectangular-shaped body member consisting of two parts arranged in superimposed relation having a pair of substantially parallel elongated cutting tool receiving channels arranged therebetween and a pair of chambers arranged between said two parts at right angles to said channels intermediate their length with one communicating with each of said channels adjacent opposite ends thereof, means for holding said parts securely together, an interiorly threaded annular member arranged in each of said chambers having their axes substantially in alignment with the axes of the respective channels, a cutting tool slidably mounted in each of said channels having the cutting edges thereof extending outwardly from opposite sides of said body member, each of said cutting tools having an exteriorly threaded portion which cooperates with the interior threads of the respective annular members to effect movement of said cutting tools longitudinally of said channels upon rotatable movement of the respective annular members, whereby said cutting tools may be adjusted selectively in said body member, and means carried by said body member for securely clamping both of said tools in their adjusted positions in said channels.

4. A rotatable tool holder of the class described comprising a body member having means arranged centrally thereof for attaching the same to a rotatable member, said body member having an elongated cutting tool receiving channel arranged therein on either side of said attaching means, which channels are arranged substantially parallel to one another and a chamber arranged at right angles to each of said channels intermediate the length thereof with one communicating with each of said channels, each of said chambers opening into the outer respective side of said body member on opposite sides thereof, an interiorly threaded annular member arranged in each of said chambers having their axes substantially in alignment with the axes of the respective channels extending outwardly through the respective openings in the outer sides of said body member, a cutting tool slidably mounted in each of said channels having the cutting edges thereof extending outwardly from opposite sides of said body member, each of said cutting tools having an exteriorly threaded portion which cooperates with the interior threads of the respective annular member to effect movement of said cutting tools longitudinally of said channels upon rotatable movement of the respective annular members, whereby said cutting tools may be adjusted selectively in said body member and radially relative thereto, and means carried by said body member for securely clamping both of said tools in their adjusted position in said channels.

5. A rotatable tool holder of the class described comprising a body member consisting of two similar halves arranged in superimposed relation, means for holding said halves securely together, means arranged centrally of said body member for attaching the same to a rotatable member, each of said halves having at least a pair of corresponding elongated cutting tool receiving channels arranged on the inner face thereof with one arranged on either side of said last mentioned means, said channels being substantially U-shaped in cross section and adapted to co-operate with the corresponding channels in the face of the opposed halves so as to provide a pair of elongated openings extending through said body member, a chamber arranged in the inner face of each of said halves communicating with the respective channels therein and open to the outer sides of said body member, an interiorly threaded nut-like member arranged in each of said chambers having their axes substantially in alignment with the axes of the respective openings and extending outwardly through the openings in the outer sides of said body member, an elongated cutting tool arranged for slidable movement in each of said openings having cutting edges arranged on the outer ends thereof and extending outwardly from opposite sides of the body member, each of said cutting tools having an exteriorly threaded portion arranged on the inner end thereof which co-operates with the interior threads of the respective nut-like members to effect movement of said cutting tools longitudinally of said openings upon rotatable movement of the respective nut-like members, whereby said cutting tools may be adjusted selectively in said body member, and means carried by said body member for clamping securely both of said cutting tools in their adjusted positions in said openings.

6. A rotatable tool holder of the class described comprising a rectangular-shaped body member consisting of two similar halves arranged in superimposed relation, means for holding said halves securely together, means arranged centrally of said body member for attaching the same to a rotatable member, each of said halves having at least a pair of corresponding elongated cutting tool receiving channels arranged on the inner face thereof with one arranged on either side of said last mentioned means substantially parallel to one another, said channels being substantially U-shaped in cross section and adapted to co-operate with the corresponding channels in the face of the opposed half so as to provide a pair of elongated parallel openings extending through said body member substantially square-shaped in cross section, a chamber arranged in the inner face of each of said halves diametrically opposite one another communicating with the respective channels therein and open to the outer sides of said body member, an interiorly threaded nut-like member arranged in each of said chambers having their axes substantially in alignment with the axes of the respective openings and extending outwardly through the openings in the outer sides of said body member, an elongated cutting tool arranged for reciprocable movement in each of said opennigs having cutting edges arranged on the outer ends thereof which extend outwardly from opposite sides of the body member, each of said cutting tools having an exteriorly threaded portion arranged on the inner end thereof which co-operates with the interior threads of the respective nut-like members to effect movement of said cutting tools longitudinally of said openings upon rotatable movement of the respective nut-like members, whereby said cutting tools may be adjusted selectively in said body member, and means carried by said body member for clamping securely both of said cutting tools in their adjusted positions in said openings.

References Cited in the file of this patent

UNITED STATES PATENTS

| 19,806 | Woodbury | Mar. 30, 1858 |
| 1,032,636 | Watkins | July 16, 1912 |
| 1,385,052 | Sargeson | July 19, 1921 |
| 1,515,377 | White | Nov. 11, 1924 |
| 1,688,913 | Ahrendt | Oct. 23, 1928 |
| 1,820,231 | Lone | Aug. 25, 1931 |
| 2,495,699 | Clark | Jan. 31, 1950 |
| 2,694,861 | Zelnick | Nov. 23, 1954 |

FOREIGN PATENTS

| 336,676 | Great Britain | Oct. 20, 1930 |
| 619,362 | Great Britain | Mar. 8, 1949 |